US006448884B1

(12) United States Patent
Yamaguchi et al.

(10) Patent No.: US 6,448,884 B1
(45) Date of Patent: Sep. 10, 2002

(54) CIRCUIT BREAKER

(75) Inventors: Noboru Yamaguchi, Shizuoka-ken (JP); Hideo Takahashi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 139 days.

(21) Appl. No.: 09/639,639

(22) Filed: Aug. 16, 2000

(30) Foreign Application Priority Data

Aug. 27, 1999 (JP) .......................................... 11-241770

(51) Int. Cl.[7] ........................ H01H 71/20; H01H 37/76; B60L 1/00; B60K 28/10

(52) U.S. Cl. ....................... 337/401; 337/157; 337/405; 337/408; 361/115; 307/10.1; 307/10.7; 180/279; 200/61.08

(58) Field of Search ................................ 337/401, 157, 337/404–406, 408, 409; 307/119, 9.1–10.8; 180/271, 274, 279, 281–283; 200/61.08; 361/115

(56) References Cited

U.S. PATENT DOCUMENTS 3,660,794 A * 5/1972 Brizzolara .................. 337/401
3,684,923 A * 8/1972 Keeler, II ................... 327/371
3,698,323 A * 10/1972 Apstein et al. ............. 102/262
3,793,501 A * 2/1974 Stonestrom .............. 200/61.08
3,803,374 A * 4/1974 Delgendre et al. ....... 200/61.08
3,873,786 A * 3/1975 Lagofun .................. 200/61.08
3,915,236 A * 10/1975 Stichling ..................... 169/26
3,932,717 A * 1/1976 Dike et al. ............... 200/61.08
3,958,206 A * 5/1976 Klint .......................... 337/160
4,030,061 A * 6/1977 Gaskell et al. ........... 200/61.08
4,124,835 A * 11/1978 Cahill, Jr. ...................... 337/1
4,150,266 A * 4/1979 Patrichi ................. 102/202.14
4,224,487 A * 9/1980 Simonsen ................ 200/61.08
4,311,890 A * 1/1982 Schroder ................. 200/61.08
4,339,638 A * 7/1982 Lascelles et al. ........... 102/216
4,342,978 A * 8/1982 Meister .................... 200/82 B
4,352,082 A * 9/1982 Barry et al. ................ 337/407
4,417,519 A * 11/1983 Lutz ........................... 102/263
4,852,494 A * 8/1989 Williams .................... 102/263
5,254,967 A * 10/1993 Biasutti et al. ............. 337/164
5,535,842 A * 7/1996 Richter et al. .............. 180/271
5,818,122 A * 10/1998 Miyazawa et al. .......... 180/282
6,107,581 A * 8/2000 Tanigawa et al. ......... 200/82 D
6,289,813 B1 * 9/2001 Duguet et al. ........... 102/202.5
6,295,930 B1 * 10/2001 Kume et al. ............. 102/202.5

FOREIGN PATENT DOCUMENTS

DE 4040900 A1 * 6/1992 ........... F02N/17/00
JP 10-55742 A * 2/1998 .......... H01H/39/00
JP 10-241523 A * 9/1998 .......... H01H/39/00
JP 10-324207 A * 12/1998 ........... B60R/21/00

* cited by examiner

*Primary Examiner*—Anatoly Vortman
(74) *Attorney, Agent, or Firm*—Finnegan, Henderson, Farabow, Garrett & Dunner, L.L.P.

(57) ABSTRACT

A circuit breaker includes: a heating portion charged with heating agent and having a conductivity which is arranged between a first connecting terminal connected to a power source side and a second connecting terminal connected to a load side; an ignition portion for causing the heating agent charged in the heating portion to generate heat by igniting an ignition agent; an expandable/contractable elastic member arranged near the heating portion or in contact with the heating portion and pressing the heating portion; an outer container receiving the elastic member, the ignition portion and the heating portion; a pressing operation restricting member preventing the elastic member from being pressed to the heating portion which is melted due to heat of the heating agent; and a heat conduction member bringing any one of the first connecting terminal and the second connecting terminal into contact with the ignition portion.

6 Claims, 7 Drawing Sheets

CIRCUIT BREAKER

BACKGROUND OF THE INVENTION

1. Field of the Invention

The present invention relates to a circuit breaker for breaking an electric circuit for a short time.

2. Description of the Related Art

In an electrical equipment system provided in a vehicle, when a certain abnormality is generated in a load such as a power window or the like or a certain abnormality is generated in a wire harness or the like constituted by a plurality of electric wires for connecting a battery to respective loads, a great current fuse interposed between the battery and the wire harness is melted and broken so as to break a communication between the battery and the wire harness, thereby preventing the respective loads, the wire harness or the like from being burned out.

However, in the electric equipment system using the great current fuse mentioned above, since the great current fuse is melted out and broken only when a current equal to or more than a predetermined allowable value flows through the great current fuse, even in the case that a certain abnormality is generated in the load such as the power window or the like or a certain abnormality is generated in the wire harness or the like for connecting the battery to the respective loads, there is a case that the circuit can not be broken and the various loads, the wire harness or the like can not be protected.

SUMMARY OF THE INVENTION

The present invention has been made by taking the matters mentioned above into consideration. Accordingly, an object of the present invention is to provide a circuit breaker which can protect electric parts by securely breaking a circuit for a short time.

Another object of the present invention is to provide a circuit breaker which can securely break a circuit for a short time even in the case that an abnormality signal is not sent due to a trouble of a control portion or the like.

In order to achieve the objects mentioned above, according to a first aspect of the present invention, there is provided a circuit breaker comprising: a heating portion charged with heating agent and having a conductivity, the heating portion being arranged between a first connecting terminal connected to a power source side and a second connecting terminal connected to a load side, and the heating portion being brought into contact with each of the first connecting terminal and the second connecting terminal; an ignition portion for causing the heating agent charged in the heating portion to generate heat by igniting an ignition agent; an expandable/contractable elastic member arranged near the heating portion or in contact with the heating portion and pressing the heating portion; an outer container receiving the elastic member, the ignition portion and the heating portion; a pressing operation restricting member preventing the elastic member from being pressed to the heating portion, the pressing operation restricting member being melted due to heat of the heating agent; and a heat conduction member bringing any one of the first connecting terminal and the second connecting terminal into contact with the ignition portion, wherein the circuit breaker normally supplies a current from the power source to the load, and the circuit breaker breaks a circuit from the power source to the load when the vehicle is abnormal.

In accordance with the invention mentioned above, when an excessive current flows through the first connecting terminal and the second connecting terminal, a temperature of the connecting terminals is increased due to the excessive current, a heat in one connecting terminal is conducted to the ignition portion via the heat conduction member and the ignition portion is ignited due to the heat. Then, the heating agent charged in the heating portion generates heat, the pressing operation restricting member is melted due to the heat and the elastic member is expanded so as to jump up the heating portion, whereby the electric connection between the heating portion, and the first connecting terminal and the second connecting terminal is broken, so that it is possible to securely break the circuit for a short time.

In accordance with a second aspect of the present invention, as it depends from the first aspect, the ignition portion ignites the ignition agent on the basis of an abnormality signal input from a control portion provided in an outer portion at a time of the abnormality of the vehicle so that the heating agent generates heat.

In accordance with the invention mentioned above, since the ignition portion ignites the ignition agent on the basis of the abnormality signal input from the control portion provided in the outer portion at a time of the abnormality of the vehicle such that the heating agent generates heat, it is possible to securely break the circuit for a short time also by an input of the abnormality signal. Further, even in the case that the circuit can not be broken since the abnormality signal is not input to the ignition portion due to the trouble in the control portion or the like, it is possible to securely break the circuit for a short time due to the temperature of one connecting terminal and it is possible to protect the electric parts.

In accordance with a third aspect of the present invention, as it depends from the first or the second aspect, the ignition portion has a pair of ignition portion terminals, a resistance provided between the pair of ignition portion terminals and the ignition agent arranged near or in contact with the resistance; one of the pair of ignition portion terminals is brought into contact with one end of the heat conduction member; another ignition portion terminal is connected to the control portion; and another end of the heat conduction member is brought into contact with the one connecting terminal.

In accordance with the invention mentioned above, since the temperature of the first connecting terminal is increased due to the excessive current and the heat due to the temperature increase is conducted to the first connecting terminal, the heat conduction member, one ignition portion terminal, the resistance and the ignition agent, it is possible to ignite the ignition agent due to the heat. Further, since another ignition portion terminal is connected to the control portion, the abnormality signal from the control portion is sent to the resistance via another ignition portion terminal and the ignition agent can be ignited due to the heat generation of the resistance.

In accordance with a fourth aspect of the present invention, as it depends from one aspect among the first aspect to the third aspect, the control portion has an electromagnetic coil through which an exciting current flows on the basis of the abnormality signal; and the control portion further has a switch having one end connected to the another ignition portion terminal and another end which is grounded, thereby the switch is turned on due to the exciting current.

In accordance with the invention mentioned above, in the control portion, when the exciting current flows through the electromagnetic coil on the basis of the abnormality signal, the switch is turned on due to the exciting current.

Accordingly, the current flows from the power source along a path of the first connecting terminal, the heat conduction member, one ignition portion terminal, the resistance, another ignition portion terminal, the switch and the earth, so that it is possible to ignite the ignition agent due to the heat generation of the resistance and it is possible to break the circuit by using the power source provided in the connecting terminal side.

In accordance with a fifth aspect of the present invention, as it depends from one aspect among the first aspect to the fourth aspect, the pressing operation restricting member mounts the elastic member in a compression state and is freely attached to and detached from the outer container; the pressing operation restricting member is arranged near or in contact with the heating portion when being mounted to the outer container; and the pressing operation restricting member is an attaching and detaching member which is melted due to heat of the heating agent.

In accordance with the invention mentioned above, the attaching and detaching member mounting the expandable/contractable elastic member in a compression state is arranged near or in contact with the heating portion when being mounted to the outer container. When the ignition portion is ignited, the heating agent charged in the heating portion generates heat, and the attaching and detaching member is melted due to the heat. Since the elastic member is expanded so as to jump up the heating portion, it is possible to securely break the circuit for a short time so as to protect the electric parts. Further, since the attaching and detaching member is structured such as to be freely attached to and detached from the outer container, it becomes easy to attach and detach the attaching and detaching member. Further, since the elastic member is held by the attaching and detaching member, no external force is applied to the connection portion between the first connecting terminal and the second connecting terminal, and the heating portion.

In accordance with a sixth aspect of the present invention, as it depends from one aspect among the first aspect to the fifth aspect, a side wall portion is formed in an end portion of the heating portion; and respective front end portions of the first connecting terminal and the second connecting terminal are bonded to the side wall portion by a material having a low melting point.

In accordance with the invention mentioned above, since the respective front end portions of the first connecting terminal and the second connecting terminal are bonded to the side wall portion by the material having a low melting point, the heating portion is jumped up when the pressing operation restricting member and the member having a low melting point are melted due to the heat generation of the heating agent, whereby an electric connection between the first connecting terminal and the second connecting terminal is broken. Accordingly, it is possible to securely break the circuit for a short time so as to protect the electric parts. Further, since no spring force is applied to the material having a low melting point corresponding to the connecting portion between the first connecting terminal and the second connecting terminal, and the heating portion, it is possible to improve a reliability of the connecting portion.

BRIEF DESCRIPTION OF THE ACCOMPANYING DRAWINGS

DESCRIPTION OF THE PREFERRED EMBODIMENTS

A description will be given below of a first embodiment according to the present invention with reference to FIG. 1.

Figure 1:
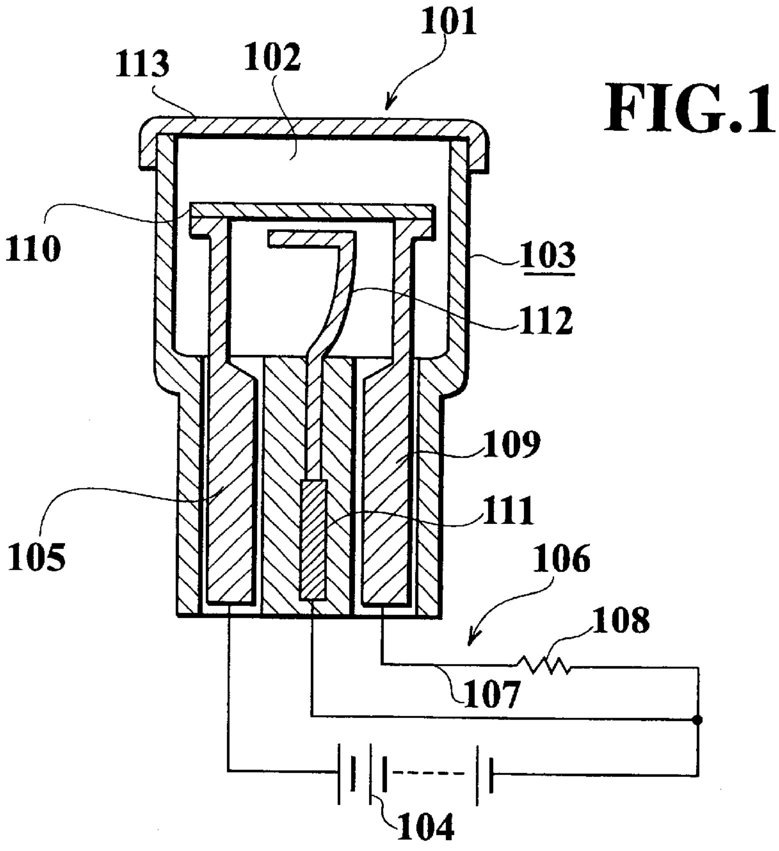
FIG. 1 is a cross-sectional view showing an embodiment of a protecting apparatus employing a bimetal in accordance a first embodiment.

FIG. 1 is a cross-sectional view showing an embodiment of a protecting apparatus employing a bimetal among protecting apparatuses. The protecting apparatus shown in FIG. 1 is provided with a housing 103 constituted by insulating resin or the like and having a fuse receiving portion 102 formed in an upper portion side, a lid 113 closing the fuse receiving portion 102 of the housing 103 so as to freely open and close, a power source terminal 105 arranged in a lower side of the housing 103 such that an upper end portion is protruded into the fuse receiving portion 102 and a lower end is exposed externally, the portion exposed externally being connected to a plus terminal of a battery 104, a load terminal 109 arranged in the lower side of the housing 103 such that an upper end portion is protruded into the fuse receiving portion 102 and a lower end is exposed externally, the portion exposed externally being connected to a load 108 via an electric wire 107 constituting a wire harness 106, a fusible body 110 constituted by metal having a low melting point or the like arranged within the fuse receiving portion 102, having one end connected to an upper end of the power source terminal 105 and another end connected to an upper end of the load terminal 109, an intermediate terminal 111 arranged in the lower side of the housing 103 so as to be disposed at an intermediate position between the power source terminal 105 and the load terminal 109 and to be exposed externally at a lower end, the portion exposed externally being connected to a minus terminal of the battery 104, and a bimetal 112 constituted by an elongated sheet member obtained by sticking two kinds of metals with each other, and arranged such that a lower end side is connected to an upper end of the intermediate terminal 111 and an upper end side is bent in an L shape so as to oppose to the fusible body 110.

Then, in the case that an ignition switch or the like of a vehicle is operated, and current flows along a path comprising the plus terminal of the battery 104, the power source terminal 105, the fusible body 110, the load terminal 109, the electric wire 107 of the wire harness 106, the load 108 and the minus terminal of the battery 104, when a certain abnormality is generated in the load 108 or the wire harness 106 connecting the load 108 to the protecting apparatus 101 and the current equal to or more than an allowable value flows through the fusible body 110, the fusible body is melted and broken due to the heat generation, thereby protecting the load 108, the wire harness 106 and the like.

Further, even in the case that a certain abnormality is generated in the load 108 or the wire harness 106 connecting the load 108 to the protecting apparatus 101 and a great current flows through the fusible body 110, when the current is not over the allowable value, the fusible body 110 generates heat due to the current flowing through the fusible body 110 and the bimetal 112 starts deforming. Then, at a time when a predetermined time has elapsed after the great current starts flowing through the fusible body 110, the front end of the bimetal 112 is brought into contact with the fusible body 110, a great short circuiting current flows through the fusible body 110 along the path comprising the plus terminal of the battery 104, the power source terminal 105, the fusible body 110, the intermediate terminal 111 and the minus terminal of the battery 104, so that the fusible body 110 is melted and broken.

Accordingly, even when the current equal to or less than the allowable value flows for a time equal to or more than the predetermined time, the circuit is broken and the wire harness 106 and the load 108 are protected.

Next, a description will be given of a second embodiment with reference to FIG. 2.

Figure 2:
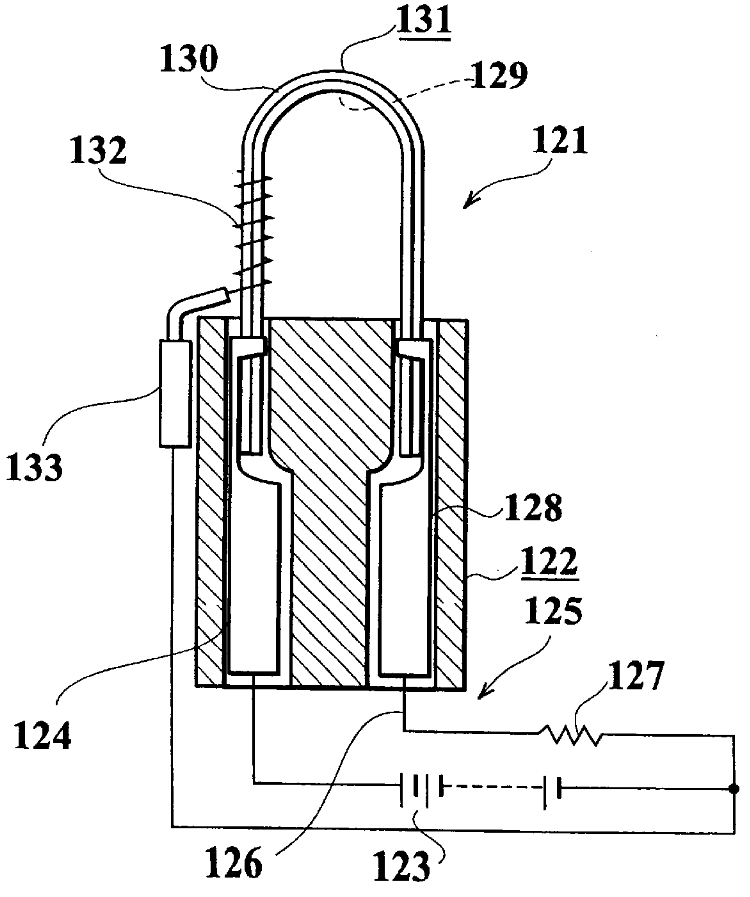
FIG. 2 is a cross-sectional view showing another embodiment of a protecting apparatus according to a second embodiment.

A protecting apparatus 121 shown in FIG. 2 is provided with a housing 122 constituted by insulating resin or the like, a power source terminal 124 installed in one side surface side of the housing 122 and connected to a plus terminal of a battery 123 in a lower end portion, a load terminal 128 installed in another side surface side of the housing 122 and having a lower end portion connected to a load 127 via an electric wire 126 constituting a wire harness 125, an electric wire 131 constituted by a fusible conductive wire 129 obtained by forming metal having a low melting point in a U shape and a heat resisting coat 130 formed so as to cover the fusible conductive wire 129, one end being connected to an upper end of the power source terminal 124 and another end being connected to an upper end of the load terminal 128, a coil 132 constituted by a shape-memory alloy formed in a shape wound around the electric wire 131 as shown in FIG. 2 under a martensite phase and returning to a base phase in a shape of fastening the electric wire 131 when heated to a temperature between120° C. and 170° C., and an external terminal 133 provided in an outer portion of the housing 122 and having an upper end connected to one end of the coil 132 and a lower end connected to the minus terminal of the battery 123.

Then, in the case that an ignition switch or the like of a vehicle is operated, and current flows along a path comprising the plus terminal of the battery 123, the power source terminal 124, the fusible body 129 of the electric wire 131, the load terminal 128, the electric wire 126 of the wire harness 125, the load 127 and the minus terminal of the battery 123, when a certain abnormality is generated in the load 127 or the wire harness 125 connecting the load 127 to the protecting apparatus 121 and the current equal to or more than an allowable value flows through the fusible body 129, the fusible body is melted and broken due to the heat generation, thereby protecting the load 127, the wire harness 125 and the like.

Further, even in the case that a certain abnormality is generated in the load 127 or the wire harness 125 connecting the load 127 to the protecting apparatus 121 and a great current flows through the fusible conductive wire 129, when the current is not over the allowable value, the fusible conductive wire 129 generates heat due to the current flowing through the fusible conductive wire 129 and the temperature of the coil 132 is increased. Then, at a time when a predetermined time has elapsed after the great current starts flowing through the fusible conductive wire 129 and the temperature of the coil 132 is increased to a temperature between 120° C. and 170 °C., the coil 132 transits from the martensite phase to the base phase, eats into the heat resisting coat 130 softened due to the heat, and is brought into contact with the fusible conductive wire 129, and a great short circuiting current flows through the fusible conductive wire 129 along the path comprising the plus terminal of the battery 123, the power source terminal 124, the fusible conductive wire 129, the coil 132, the external terminal 133 and the minus terminal of the battery 123, so that the fusible conductive wire 129 is melted and broken.

Accordingly, even when the current equal to or less than the allowable value flows for a time equal to or more than the predetermined time, the circuit is broken and the wire harness 125 and the load 127 are protected.

Figure 3:
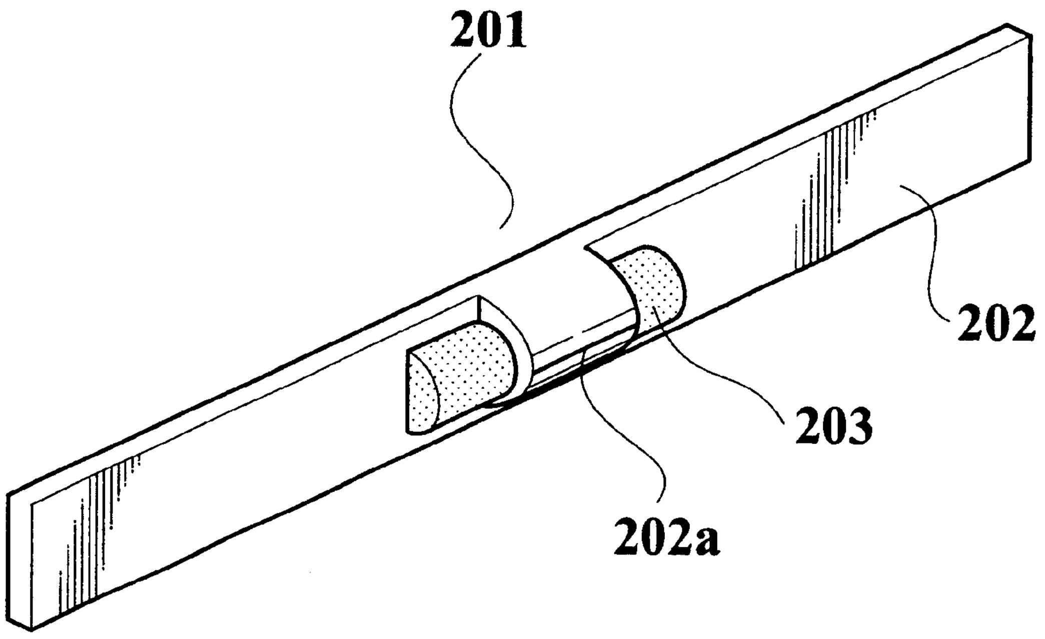
FIG. 3 is a perspective view of a fusible conductor for a fusible link.

Further, FIG. 3 is a perspective view of a fusible conductor for a fusible link. The fusible conductor 201 for the fusible link is structured such that a fusible conductor piece 203 made of metal having a low melting point is held in an intermediate portion of a fusible conductor main body 202 made of metal having a high melting metal via a gripping piece 202*a,* thereby improving a melting property due to generation of an alloy according to a diffusion of the metal having a low melting point.

In accordance with the structure mentioned above, when an excessive current flows through the fusible conductor main body 202, the melting of the fusible conductor piece 203 is generated due to the heat of generation, whereby it is possible to melt down and break the fusible conductor 201.

However, in the conventional protecting apparatuses 101 and 121 mentioned above, there are problems mentioned below.

At first, in the protecting apparatus shown in FIG. 1, since it is detected by using the bimetal 112 obtained by sticking two kinds of metals having different coefficients of thermal expansion to each other whether or not a great current flows through the fusible body 110, the bimetal 112 is deformed when a magnitude of the current flowing through the fusible body 110 is changed, so that a time required for breaking the circuit is changed.

Accordingly, when a trouble that a great current intermittently flows is generated, the temperature of the fusible body 110 is increased only to a certain degree, so that there is a risk that the wire harness 106, the load 108 or the like starts burning before the protecting apparatus 101 breaks the circuit.

On the contrary, the protecting apparatus 121 shown in FIG. 2, since it is detected by using the coil 132 constituted by the shape-memory alloy whether or not a great current flows through the fusible conductive wire 129, the coil 132 is deformed when the magnitude of the current flowing through the fusible conductive wire 129 is changed, so that a time required for breaking the circuit is changed.

Accordingly, when a trouble that a great current intermittently flows is generated, the temperature of the fusible conductive wire 129 is increased only to a certain degree, so that there is a risk that the wire harness 125, the load 127 or the like is excessively heated before the protecting apparatus 121 breaks the circuit.

Further, in the protecting apparatus shown in FIGS. 1 and 2, the thermal reaction time of the bimetal 112 and the coil 132 corresponding to the heat deforming conductive member is affected by an energizing current. Further, there is a case that the thermal reaction of the heat deforming conductive member is not timely operated at a time of abnormality (an excessive current flow).

Further, in the fusible conductor 201 shown in FIG. 3, since a time of diffusing the metal having a low melting point into a copper alloy is affected by the energizing current and a lot of time is required for diffusing the metal having a low melting point, there is a case that the fusible conductor does not operate timely at a time of abnormality (an excessive current flow).

Then, as a circuit breaker timely operating at a time of abnormality (an excessive current flow), the applicant of the present invention filed a circuit breaker described in Japanese Patent Application No. 11-64055 (which was filed on Mar.10, 1999 and has not been laid open). The circuit breaker is schematically structured such as to provide a pair of connection terminals constituted by a battery connection terminal (for example, a bus bar) and a load connection terminal, provide a conductive member (for example, a thermit case) electrically brought into contact with each of the pair of connection terminals, move the conductive member upward by a compression spring or the like in response to the abnormality signal input from the control circuit or the like at a time when the vehicle is abnormal, and shut an electrical connection between one connection terminal and another connection terminal so as to break the circuit.

However, in this circuit breaker, there is a problem that it is impossible to break the circuit in the case that the abnormality signal is not sent to the circuit breaker because a wire breaking is generated in the control circuit or the like or the current sensor or the like is broken.

Taking the matter mentioned above into consideration, the applicant of the present invention provides an improvement of a circuit breaker which can securely break the circuit for a short time so as to protect the electrical parts, and securely break the circuit for a short time even in the case that an abnormality signal is not sent due to a trouble of the control portion or the like. A description will be in detail given below of the apparatus as a third embodiment with reference to FIGS. 4 to 9.

The circuit breaker according to the third embodiment is particularly characterized in that the circuit is broken due to a heat generated by a temperature increase of the bus bar in response to an excessive current even in the case that the circuit can not be broken because the abnormality signal is not input to the ignition portion due to the trouble in the control portion or the like.

Figure 4:
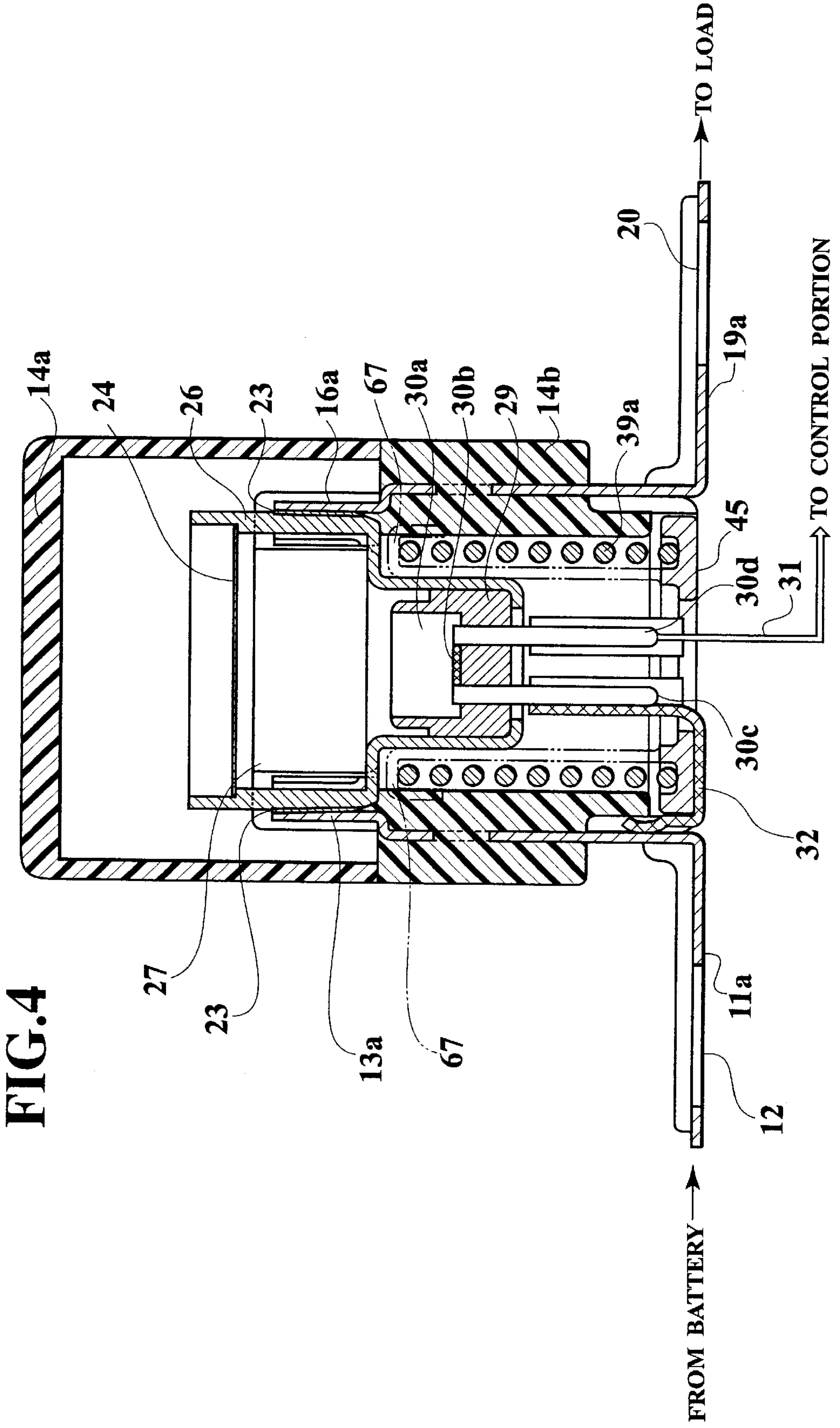
FIG. 4 is a cross-sectional view of a circuit breaker according to a third embodiment before being broken.

In the circuit breaker shown in FIG. 4, a plate-like long first bus bar 11*a* is made of, for example, copper or copper alloy, and is connected to a battery 1. Further, a plate-like long second bus bar 19*a* is also made of, for example, copper or copper alloy, and is connected to a load (not shown) or the like.

Figure 5:
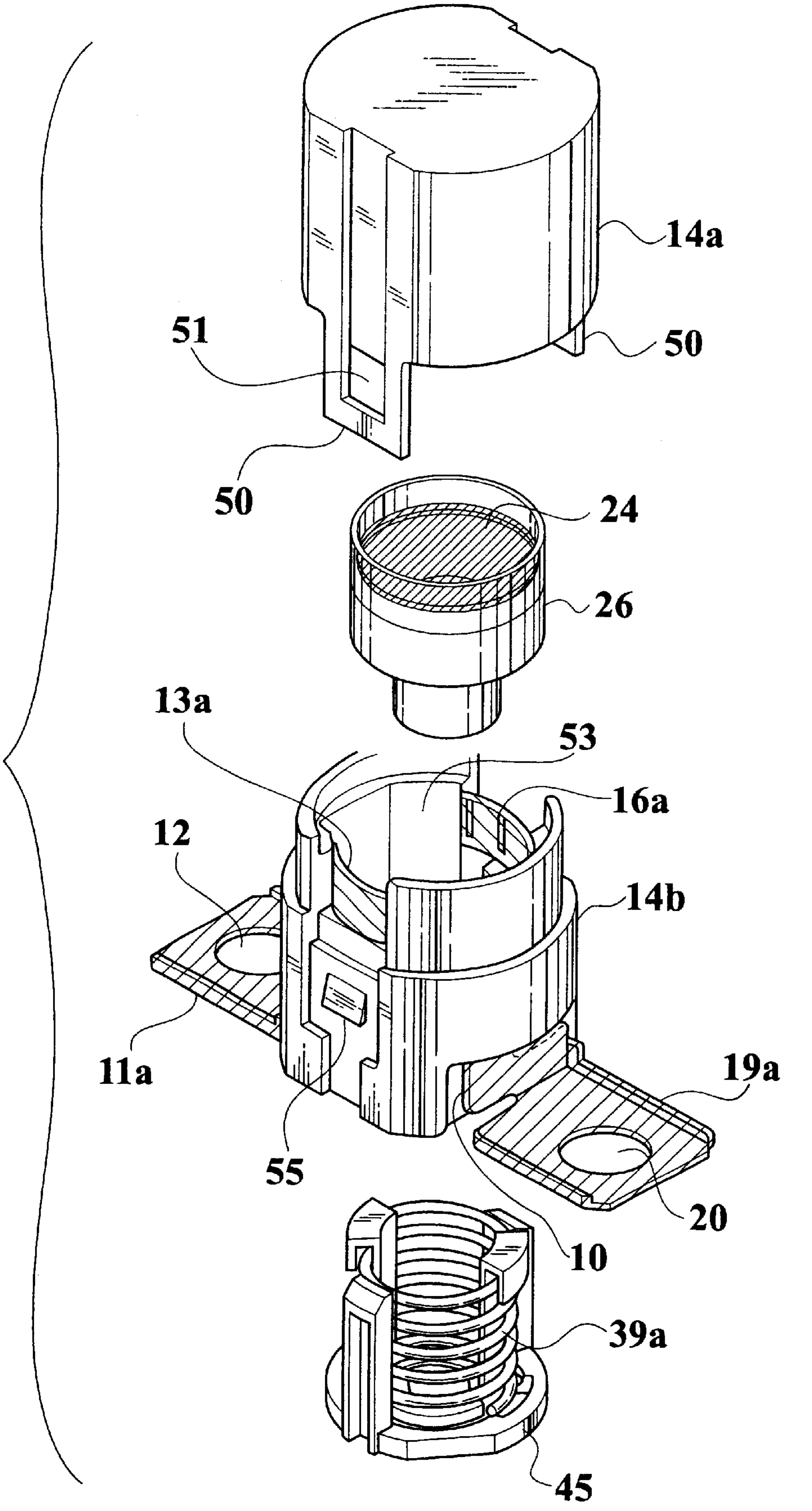
FIG. 5 is a perspective view of an assembly of the circuit breaker.

In FIG. 5, an extended portion 50 having a rectangular groove portion 51 is formed in a cap 14*a,* and a wedge-like engaging portion 55 is formed in a resin case 14*b,* so that the structure is made such that the engaging portion 55 is fitted to the groove portion 51, whereby the cap 14*a* is covered on the resin case 14*b.* The cap 14*a* and the resin case 14*b* constitute an outer container, and is constituted by a container made of an insulating material such as a resin (a thermoplastic resin) or the like.

A cylindrical thermit case 26 is received in an opening portion 53 formed in the resin case 14*b,* an ignition portion 29 to which a heating agent 27 and a lead wire 31 are connected is received in the thermit case 26, and an upper lid 24 is put on an upper portion of the heating agent.

The thermit case 26 preferably employs a material having a good heat conductivity and infusible due to a heat generation of the heating agent 27, for example, a brass, a copper, a copper alloy, a stainless steel or the like. The thermit case 26 is formed by a metal drawing or the like, and is formed in a cylindrical shape of a rectangular parallelepiped.

The ignition portion 29 is structured so as to ignite an ignition agent 30*a* due to a heat generated by the current flowing through the lead wire 31 at a time of abnormality of the vehicle such as a collision of the vehicle or the like so as to generate a thermit reaction heat in the heating agent 27.

The first bus bar 11*a* having a round hole portion 12 and the second bus bar 19*a* having a round hole portion 20 are upward bent so as to form a substantially vertical angle, the bent portion passes through the resin case 14*b,* and bus bar front end portions 13*a* and 16*a* are brought into contact with right and left side wall portions of the thermit case 26 via metal having a low melting point 23 corresponding to the material having a low melting point such as a solder (for example, having a melting point of 200° C. to 300° C.) or the like.

The right and left side wall portions of the thermit case 26 are bonded to the bus bar front end portions 13*a* and 16*a* by the metal having a low melting point 23, whereby the first bus bar 11*a* and the second bus bar 19*a* can be electrically connected via the metal having a low melting point 23 and the thermit case 26.

The metal having a low melting point 23 is, for example, made of at least one kind of metal selected from the group of Sn, Pb, Zn, Al and Cu.

The heating agent 27 is, for example, constituted by metal oxide powders such as iron oxide ($Fe_2O_3$) or the like, and aluminum powders, and corresponds to a thermit agent which generates a thermit reaction due to a heat generation of the lead wire 31 so as to generate a high heat. The thermit agent is sealed in the thermit case 26 corresponding to a metal container for preventing moisture. In this case, in place of employing the iron oxide ($Fe_2O_3$), a chrome oxide ($Cr_2O_3$), a manganese oxide ($MnO_2$) or the like may be employed.

Further, as the heating agent 27, it is possible to employ at least one kind of mixture constituted by at least one kind of metal powders selected from the group of B, Sn, FeSi, Zr, Ti and Al, at least one kind of metal oxide selected from the group of CuO, $MnO_2$, $Pb_3O_4$, $PbO_2$, $Fe_3O_4$ and $Fe_2O_3$, and an additive made of an alumina, a bentonite, a talc or the like. In accordance with the heating agent mentioned above, it is possible to easily ignite by the ignition portion 29 and it is possible to melt the metal having a low melting point 23 a short time.

Further, a retainer 45 constituted by a resin member is arranged within an opening portion 53 of the resin case 14b and in a lower portion of the thermit case 26. The retainer 45 constitutes an attaching and detaching member which mounts a compression spring 39*a* in a compression state, is freely attached to and detached from the resin case 14*b,* is arranged near or in contact with the thermit case 26 when being mounted to the resin case 14*b,* and melts due to heat of the heating agent 27.

Figure 8:
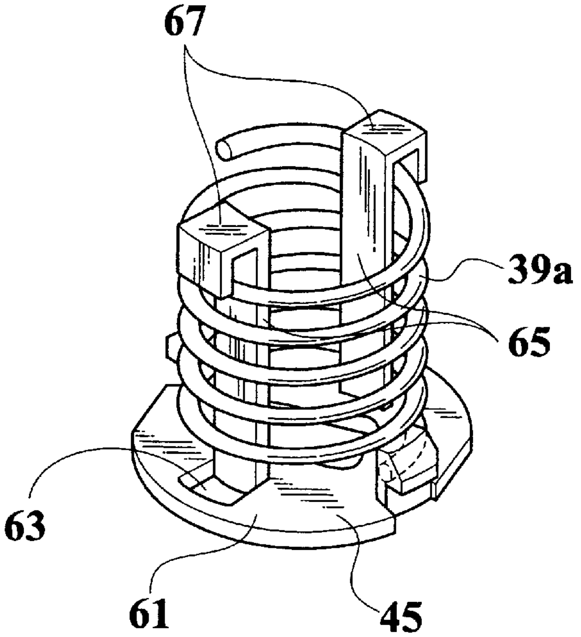
FIG. 8 is a state view of a retainer of the circuit breaker before being broken.
Figure 9:
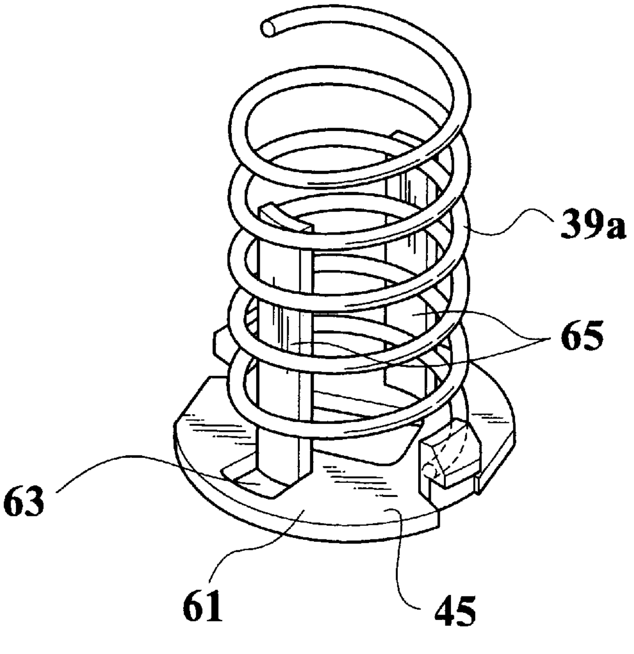
FIG. 9 is a state view of the retainer of the circuit breaker after being broken.

The retainer 45 is structured, as shown in FIG. 8, so as to have a base portion 61, a notch portion 63 formed in the base portion 61, a retainer body portion 65 standing from the notch portion 63 and the base portion 61, and a pair of retainer engaging portions 67 formed at a front end of the retainer body portion 65, and the structure is made such that a pair of retainer engaging portions 67 are mounted to the resin case 14*b*.

The compression spring 39*a* spirally wound around the retainer body portion 65 is arranged in an outer side of the retainer body portion 65, and a front end portion of the compression spring 39*a* is engaged with the retainer engaging portion 67. That is, the compression spring 39*a* is held in the retainer 45 in a compressed state.

The ignition portion 29 has a pair of ignition portion terminals 30*c* and 30*d*, a resistance 30*b* provided between the pair of ignition portion terminals 30*c* and 30*d*, and an ignition agent 30*a* arranged near or in contact with the resistance 30*b*.

Figure 6:
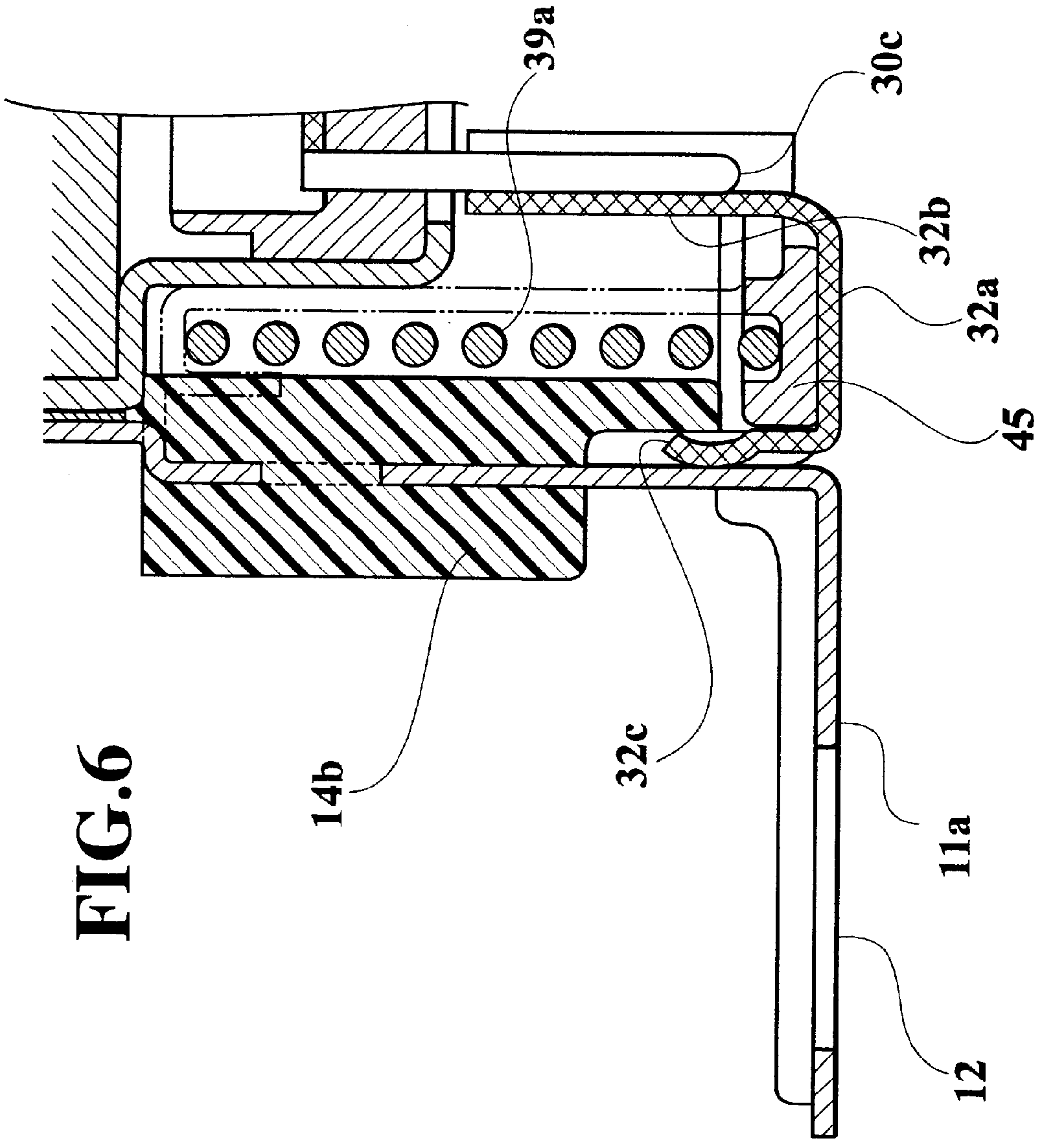
FIG. 6 is a detailed view of a heat conduction terminal provided in the circuit breaker and a peripheral portion thereof.

Further, there is provided a heat conduction terminal 32 corresponding to a heat conduction member brought into contact with the bent portion of the first bus bar 11*a* and the ignition portion terminal 30*c*, and made of, for example, a copper, a copper alloy or the like. The heat conduction terminal 32 is, as shown in FIG. 6, formed substantially in an L shape, and is structured such as to form a heat conduction terminal main body 32*a*, a bus bar contact piece 32*c* protruding in a circular arc shape so as to be press contact with the first bus bar 11*a*, and an ignition portion contact piece 32*b* being surface contact with the ignition portion terminal 30*c* and be inserted from a lower portion of the resin case 14*b*. The ignition portion terminal 30*d* is connected to a control portion 70 shown in FIG. 7 via a lead wire 31.

Figure 7:
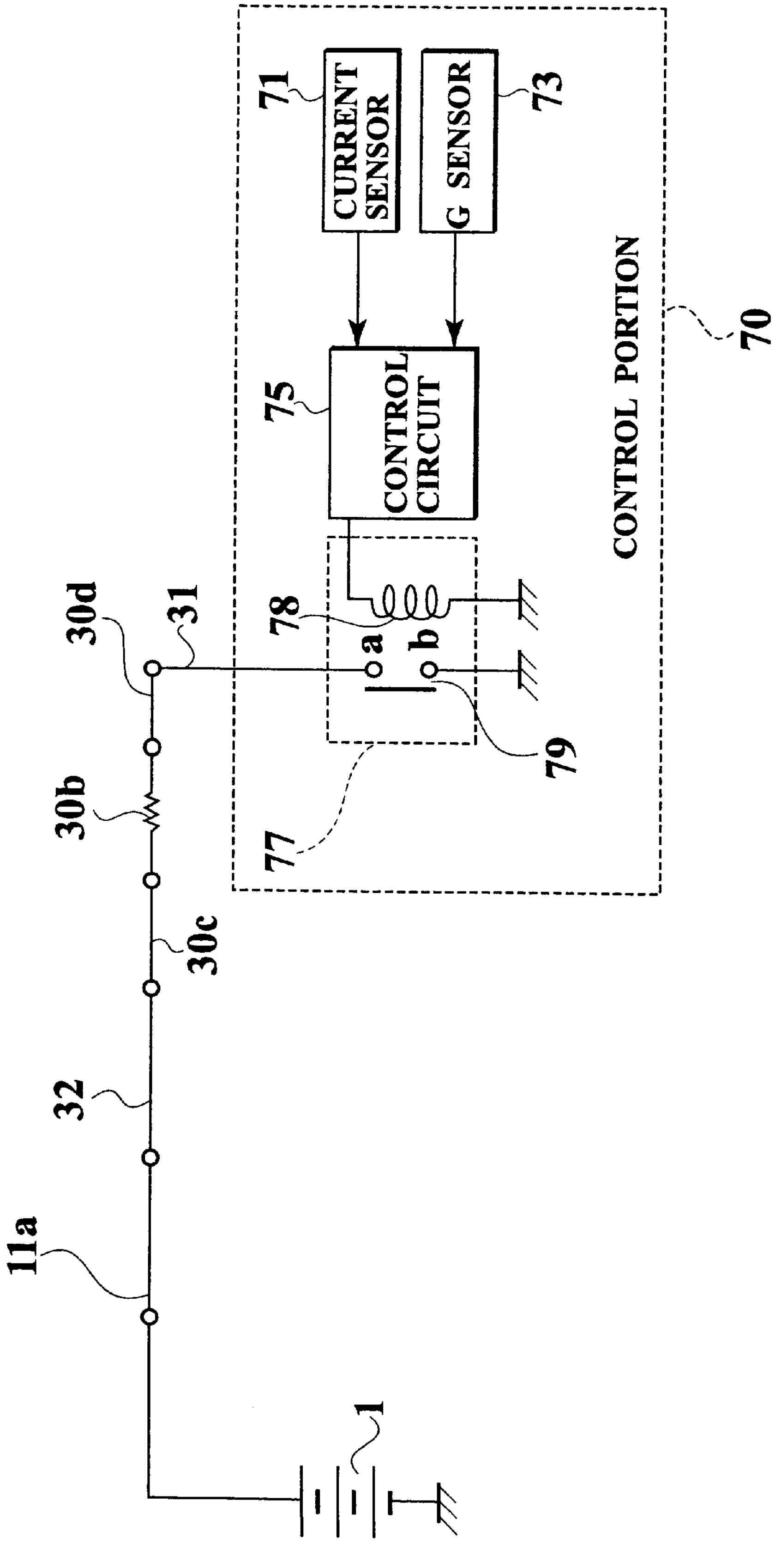
FIG. 7 is a circuit diagram of a control portion connected to the circuit breaker.

The control portion 70 has, as shown in FIG. 7, a current sensor 71 for detecting a current flowing through each of the first bus bar 11*a* and the second bus bar 19*a*, a collision sensor (a G sensor) 73 for detecting a collision of the vehicle, a control circuit 75 for outputting a drive control signal as an abnormality signal to a drive circuit 77 in the case that a detected current value detected by the current sensor 71 becomes equal to or more than a threshold value or outputting a drive control signal to an electromagnetic relay 77 in the case that a detected acceleration value detected by the G sensor 73 becomes equal to or more than a predetermined value, and the electromagnetic relay 77 driven according to a drive control signal from the control circuit 75.

The electromagnetic relay 77 has an electromagnetic coil 78 through which an exciting current flows according to the abnormality signal (here, corresponding to the drive control signal), and a switch 79 whose one end a is connected to the ignition portion terminal 30*d* via the lead wire 31 and another end b is grounded, thereby being turned on according to the exciting current.

In this case, the circuit breaker may be structured such a voltage sensor for detecting an excessive voltage and a temperature sensor for detecting a temperature are provided so a as to output an output from the voltage sensor and an output from the temperature sensor to the control circuit 75.

The abnormality signal is input to the ignition portion 29 in the case that the value of the current mentioned above becomes equal to or more than a threshold value, and the value of the current when the heating agent 27 generates heat due to the heat from the heat conduction terminal 32 via the first bus bar 11*a* is set to a value over the threshold value mentioned above.

Next, a description will be given of an operation of the circuit breaker according to the embodiment structure in this manner with reference to the accompanying drawings.

At first, in a normal state, the first bus bar 11*a* and the second bus bar 19*a* are electrically connected to each other via the metal having a low melting point 23 and the thermit case 26, and a current is supplied to a load (not shown) from the battery 1.

Next, a description will be given of an operation in the case that the current sensor 71, the G sensor 73, the control circuit 75 and the like are normal -and the abnormality signal is sent to the ignition portion 29 when the vehicle is abnormal. When the abnormality is generated in the vehicle and the excessive current flows through the first bus bar 11*a* and the second bus bar 19*a*, the current sensor 71 detects the current. In the case that the detected current value detected by the current sensor 71 becomes equal to or more than the threshold value, the control circuit 75 outputs the drive control signal to the electromagnetic coil 78, so that the exciting current flows through the electromagnetic coil 78 and the switch 79 turns on due to the exciting current.

Then, the current flows from the buttery (the power source) 1 along the path comprising the first bus bar 11*a*, the heat conduction terminal 32, the ignition portion terminal 30*c*, the resistance 30*b*, the ignition portion terminal 30*d*, the lead wire 31, the switch 79 and the earth. Accordingly, the resistance 30*b* generates heat. When the temperature of the resistance 30*b* becomes 350° C. or more, the ignition agent is ignited and the heating agent 27 which is the thermit agent generates a thermit reaction heat according to the following reaction formula.

$$Fe_2O_3+2AL \rightarrow AL_2O_3+2Fe+386.2Kcal$$

The thermit case 26 is heated due to the thermit reaction heat and the metal having a low melting point 23 is heated due to the heat generation of the heating agent 27 and the heat of the thermit case 26, thereby being melted. Further, at the same time of this, the resin retainer engaging portion 67 compressing and fixing the compression spring 39*a* to the retainer 45 is melted due to the heat mentioned above. Then, as shown in FIG. 6, since the compression spring 39*a* is extended, the thermit case 26 jumps up in a direction of the cap 14*a*.

Accordingly, an electrical connection between the thermit case 26, and the first bus bar 11*a* and the second bus bar 19*a* is shut. That is, the electrical circuit of the vehicle is securely broken for a short time. Further, it is possible to break the circuit according to the abnormality signal by utilizing the power source voltage from the buttery 1.

Next, a description will be given of an operation in the case that breaking of the current sensor 71 and the G sensor 73, breaking of the control circuit 75 or the like is generated and the abnormality signal is not sent to the ignition portion 29 when the vehicle is abnormal. In this case, the switch 79 in the electromagnetic relay 77 is in an off state.

At first, when an excessive current exceeding the threshold value flows through the first bus bar 11*a*, the temperature of the first bus bar 11 is increased, the temperature becomes, for example, equal to or more than 350° C., and the heat due to the temperature increase is conducted to the first bus bar 11*a*, the heat conduction terminal 32, the ignition portion terminal 30*c*, the resistance 30*b* and the ignition agent 30*a*.

Accordingly, the ignition agent 30*a* is ignited due to the heat (for example, when the temperature becomes equal to or more than 350° C.), the heating agent 27 generates heat, the thermit case 26 is heated due to the heat, and the metal having a low melting point 23 is heated due to the heat generated by the heating agent 27 and the heat of the thermit case 26 and melted. Further, at the same time of this, the resin retainer engaging portion 67 compressing and fixing the compression spring 39*a* to the retainer 45 is melted due to the heat mentioned above. Then, as shown in FIG. 6, since the compression spring 39*a* is expanded, the thermit case 26 jumps up in a direction of the cap 14*a*.

Accordingly, the electrical connection between the thermit case 26, and the first bus bar 11*a* and the second bus bar 19*a* is shut. That is, even in the case that the circuit can not be broken due to the trouble of the control portion 70 or the like, it is possible to securely break the circuit for a short time due to the heat generated by the temperature increase of the bus bar at a time of the excessive current.

Further, even when there is no sensor such as the current sensor 71 or the like, it is possible to break the circuit by detecting the temperature. Further, in comparison with the method of melting down the circuit member shown in FIG. 3, since the circuit breaker according to the third embodiment employs the heat conduction terminal 32, it is possible to reduce the circuit resistance of the fuse, so that there is no natural breaking or the like, and it is possible to improve a safety.

Further, since the abnormality signal is input to the ignition portion 29 in the case that the value of the current becomes equal to or more than the threshold value, and the value of the current when the heating agent 27 generates heat by the heat from the heat conduction terminal 32 via the first bus bar 11*a* is set to a value over the threshold value, it is possible to break the circuit due to the heat from the heat conduction terminal 32 via the first bus bar 11*a* in the case that it is impossible to break the circuit according to the abnormality signal from the control portion 70, and the circuit is not broken due to the heat from the heat conduction terminal 32 before the circuit is broken according to the abnormality signal.

Further, since the retainer engagement portion 67 is placed in the inner side of the compression spring 39*a*, the retainer engagement portion 67 tends to be inclined inward due to the reaction force of the compression spring 39*a*, whereby the thermit case 26 and the retainer 45 are brought into strong contact with each other. Accordingly, since the heat conduction is well performed from the thermit case 26 to the retainer 45, it is possible to effectively melt the retainer engagement portion 67.

Further, it is possible to easily assemble the compression spring 39*a* in the retainer 45 only by inclining the retainer engagement portion 67 inward and pressing the compression spring 39*a* to the retainer 45, and it is possible to easily mount the retainer 45 to the resin case. 14*b*.

Further, since the compression spring 39*a* is held by the retainer 45, no external force is applied to the bonding portion between the first bus bar 11*a* and the second bus bar 19*b*, and the thermit case 26, that is, the metal having a low melting point 23. Accordingly, it is possible to improve a reliability of the bonding portion.

Further, since the sub-assembly between the compression spring 39*a* and the retainer 45 is inserted from the lower surface of the fuse, that is, the opening portion 53*f* of the resin case 14*b*, a total assembly of the circuit breaker is easily performed. Further, after the circuit is broken, the resin case 14*b* can be reused as the fuse in the existing state only by replacing the retainer 45 and the thermit case 26.

Further, since the cap 14*a* is put on the resin case 14*b*, the thermit case 26 does not go out from the cap 14*a* when the circuit is broken, whereby it is possible to prevent a burn due to the heat or the like.

In this case, the present invention is not limited to the circuit breaker according to the embodiments mentioned above. In the embodiments, the structure is made such that the compression spring 39*a* and the metal having a low melting point 23 are provided and the circuit is broken when the retainer 45 and the metal having a low melting point 23 are melted down, however, the structure may be made, for example, such that only the retainer 45 is provided without providing the metal having a low melting point 23 and the circuit is broken when the retainer 45 is melted down.

Further, in the embodiments, the resin member is employed for the retainer 45, however, the retainer 45 may employ metal having a low melting point such as a solder (for example, having a melting point of 200° C. to 300° C.) melting due to the heat of the heating agent 27 or the like. In addition, it is a matter of course that the present invention can be realized by variously modifying within a technical scope of the present invention.

The entire contents of Japanese Patent Application P11-241770 (filed Aug. 27, 1999) are incorporated herein by reference.

What is claimed is:

1. A circuit breaker, comprising:

an electrical heating portion charged with a heating agent and having an electrical conductivity, the heating portion being arranged between a first connecting terminal connected to a power source side and a second connecting terminal connected to a load side, and the heating portion being brought into contact with each of the first connecting terminal and the second connecting terminal;

an ignition portion for causing the heating agent charged in the heating portion to generate heat by igniting an ignition agent;

an expandable/contractable elastic member arranged near the heating portion or in contact with the heating portion and pressing the heating portion;

an outer container receiving the elastic member, the ignition portion and the heating portion;

a pressing operation restricting member preventing the elastic member from being pressed to the heating portion, the pressing operation restricting member being melted due to heat of the heating agent; and a heat conduction member bringing any one of the first connecting terminal and the second connecting terminal into thermal contact with the ignition portion, wherein the circuit breaker normally supplies a current from the power source to the load, and the circuit breaker breaks a circuit from the power source to the load when the load is abnormal.

2. A circuit breaker according to claim 1, wherein the ignition portion ignites the ignition agent on the basis of an abnormality signal input from a control portion provided in an outer portion at a time of the abnormality of the vehicle so that the heating agent generates heat.

3. A circuit breaker according to claim 2, wherein the ignition portion has a pair of ignition portion terminals, a resistance provided between the pair of ignition portion terminals and the ignition agent arranged near or in contact with the resistance;

one of the pair of ignition portion terminals is brought into contact with one end of the heat conduction member;

another ignition portion terminal is connected to the control portion; and another end of the heat conduction member is brought into contact with the one connecting terminal.

4. A circuit breaker according to claim 3, wherein the control portion has an electromagnetic coil through which an exciting current flows on the basis of the abnormality signal; and the control portion further has a switch having one end connected to the another ignition portion terminal and another end which is grounded, thereby the switch is turned on due to the exciting current.

5. A circuit breaker according to claim 4, wherein the pressing operation restricting member mounts the elastic member in a compression state and is freely attached to and detached from the outer container;

the pressing operation restricting member is arranged near or in contact with the heating portion when being mounted to the outer container; and the pressing operation restricting member is an attaching and detaching member which is melted due to heat of the heating agent.

6. A circuit breaker according to claim 5, wherein a side wall portion is formed in an end portion of the heating portion; and respective front end portions of the first connecting terminal and the second connecting terminal are bonded to the side wall portion by a material having a low melting point.

* * * * *

UNITED STATES PATENT AND TRADEMARK OFFICE

CERTIFICATE OF CORRECTION

PATENT NO. : 6,448,884 B1
DATED : September 10, 2002
INVENTOR(S) : Noboru Yamaguchi and Hideo Takahashi It is certified that error appears in the above-identified patent and that said Letters Patent is hereby corrected as shown below:

Column 12,
Line 19, before "heating portion", "an electrical" should read -- a --.

Signed and Sealed this

Eleventh Day of February, 2003

JAMES E. ROGAN
*Director of the United States Patent and Trademark Office*